United States Patent
Hämäläinen et al.

(10) Patent No.: US 6,181,686 B1
(45) Date of Patent: *Jan. 30, 2001

(54) AUTOMATIC DATA TRANSFER MODE CONTROL

(75) Inventors: Jari Hämäläinen, Tampere; Harri Jokinen, Hiisi; Markus Hakaste, Helsinki, all of (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/886,089

(22) Filed: Jul. 2, 1997

(30) Foreign Application Priority Data

Jul. 12, 1996 (FI) .......................................... 962834

(51) Int. Cl.⁷ .............................. H04B 7/212; H04Q 7/20
(52) U.S. Cl. ......................... 370/347; 370/337; 370/478; 370/498; 455/422
(58) Field of Search .................... 370/320, 333, 370/342, 522, 479, 216, 398, 349, 328, 347, 335, 498, 478; 455/67.1, 69, 422; 358/403; 375/222

(56) References Cited

U.S. PATENT DOCUMENTS

| | | | |
|---|---|---|---|
| 5,555,260 | * 9/1996 | Rinnback et al. | 370/347 |
| 5,590,133 | * 12/1996 | Billstrom et al. | 370/349 |
| 5,648,967 | * 7/1997 | Schulz | 370/328 |
| 5,722,051 | * 2/1998 | Agrawal et al. | 455/69 |
| 5,726,764 | * 3/1998 | Averbuch et al. | 358/403 |
| 5,729,536 | * 3/1998 | Doshi et al. | 370/398 |
| 5,809,066 | * 9/1998 | Suomi et al. | 375/222 |
| 5,844,885 | * 12/1998 | Grob et al. | 370/216 |
| 5,857,147 | * 1/1999 | Gardner et al. | 455/67.1 |
| 5,909,648 | * 6/1999 | Boudreaux et al. | 455/422 |

FOREIGN PATENT DOCUMENTS

| | | |
|---|---|---|
| 0423485 A1 | 4/1991 | (EP) . |
| WO 95/28814 | 10/1995 | (WO) . |

* cited by examiner

*Primary Examiner*—Hassan Kizou
*Assistant Examiner*—John Pezzlo
(74) *Attorney, Agent, or Firm*—Perman & Green, LLP

(57) ABSTRACT

The method according to the invention relates in general to transmission in cellular telecommunication systems and in particular to optimization of the data transfer mode. In the method according to the invention the data transfer mode is controlled using the downlink quality measured by the mobile station (MS) and the uplink quality measured by the base station (BTS). For transparent connections it can be determined a desired maximum threshold for the RXQUAL value, and when the uplink or downlink RXQUAL exceeds that maximum threshold (ie. the bit error rate BER exceeds the maximum value), a more error-tolerant channel coding of a lower transmission speed is taken into use and the channel resources available are increased e.g. by growing the number of time slots to keep the user data transmission rate constant.

18 Claims, 4 Drawing Sheets

AUTOMATIC DATA TRANSFER MODE CONTROL

BACKGROUND OF THE INVENTION

The method according to the invention relates in general to transmission in cellular telecommunication systems and in particular to data transfer mode optimization.

In the GSM system, the transmission rate on the TCH channel (TCH/F) used in the transmission between a mobile station MS and a base station BTS is 22.8 kbit/s regardless of the channel coding used. To correct errors, different channel codings are used on the channel that are based on increasing the redundancy of the data transferred: for each information bit it is sent on average more than one bit. The higher the decoding redundancy, the bigger the errors that can be corrected. As the raw transmission speed on the channel is constant, increasing the redundancy decreases the useful transmission rate perceived by the user. Therefore, choosing a channel coding method involves a compromise between transmission reliability and speed.

Coding that offers the fastest transmission rate but the poorest error elimination, namely the ½ convolution coding, provides a 12-kbit/s transmission speed for encoded data. In addition to the user's data, the channel also transmits control signals related to the transmission protocol, which leaves a 9.6-kbit/s capacity for the transmission of user data. The more reliable ⅓ convolution coding provides a transmission speed of 4.8 kbit/s, and the ⅙ convolution coding, which is the most effective in eliminating errors, provides a 2.4-kbit/s transmission rate for user data. In the GSM standards these data transfer modes are named TCH/F9.6, TCH/F4.8 and TCH/F2.4. On the half-rate TCH channel (TCH/H) of the GSM system, the ½ convolution coding produces a transmission rate of 6 kbit/s for encoded data and thus the user can transmit his data at 4.8 kbit/s, and the ⅓ convolution coding enables a 2.4-kbit/s transmission speed. In the GSM standards these data transfer modes are known as TCH/H4.8 and TCH/H2.4. Data transfer modes that use only channel coding are called transparent modes, abbreviated to T in the GSM recommendations. In these modes the user data transmission rate is predetermined and constant, and the GSM system has no effect on the transmission; only the bit error rate (BER) may vary according to the connection quality.

In addition to channel coding, the GSM system also uses another communication protocol aimed at error elimination, namely, the radio link protocol (RLP). With the RLP protocol in use, the transmitting apparatus packetizes the data into numbered packets, or frames, according to the RLP protocol. If the receiving apparatus does not receive a frame correctly, it can request the transmitting apparatus to re-transmit that frame. If the connection is very noisy, one and the same frame may have to be re-transmitted many times over. This arrangement ensures that the bit error rate (BER) keeps constant, but the transmission rate for user data varies according to the network load and connection quality. Therefore, data transfer modes that use the RLP protocol in addition to channel coding are called non-transparent modes, abbreviated to NT in the GSM recommendations.

The basic structure of the GSM system, known to a person skilled in the art, is described in greater detail in "The GSM System for Mobile Communications" by Michel Mouly and Marie-Bernadette Pautet, ISBN 2-9507190-0-7, Palaiseau 1992, 701 pp. and in the GSM recommendations, for example. These sources also describe in more detail all aforementioned protocols and data transfer modes.

In the current GSM system the user can change the channel coding used by the mobile station. Thus the user is able to maximize the transmission rate in non-transparent data transfer modes. Close to a base station, where connection quality is good, the user should choose a channel coding method that provides the fastest transmission rate (TCH/F9.6). In the fringe areas of the cell, where connection quality is poor and the number of errors is higher, the user should choose channel coding which is better at preventing errors, such as TCH/F4.8, in order to decrease the number of re-transmissions of frames in accordance with the RLP protocol. Currently the GSM system controls the channel coding mode of a mobile station only in fax connections. Therefore, the user has to do the optimization himself, which requires knowledge of the structure of the GSM system. If the user is moving he may have to change the channel coding at short intervals, trying to find the most suitable one. Furthermore, the user has no access to all the information needed for making the optimum choice, such as information about the quality of the connection.

As regards transparent connections, the question of optimizing data transmission arises when the changes in the GSM system and the universal mobile telecommunication system (UMTS), which are now under development, are realized. A new channel coding method enabling a transmission speed of 14.4 kbit/s and a high speed circuit switched data (HSCSD) system are at the moment being developed for the GSM. In the HSCSD system, a user may take into use more than one time slot, ie. more than one TCH channel, in order to increase the transmission speed.

According to plans, the future UMTS system will also have a wider selection of transmission rates than the current GSM system.

In transparent connections the quality of the connection affects only the bit error rate, not the transmission speed. The bit error rate can be dropped only by enhancing channel coding, thereby increasing the amount of encoded data transferred on the transmission path. In the current GSM system this can be done e.g. by changing from the half-rate data transfer mode TCH/H4.8 to the full-rate data transfer mode TCH/F4.8, in which case the transmission rate for user data keeps constant but the channel coding level and thus the amount of raw data transferred via the radio link goes up. Correspondingly, in the HSCSD system the user can take into use more channel resources, or time slots.

So, in the case of transparent connections, data transfer mode optimization has an effect on the quantity of channel resources used. In the HSCSD system, the quantity of channel resources used will affect the user's phone bills, for it is planned that along with the new transmission speeds invoicing will be based, in addition to the current criteria, also on the channel resources used. Thus it will be more expensive to use high transmission rates than low transmission rates that use fewer time slots.

The publication WO 95/28814 describes a method for adapting the data transmission mode in a cellular telephone network as a response to changes in the quality of the radio link between a base station and a mobile station. In the described method, the source coding and channel coding are chosen according to results of two distinct analyses of the transmission quality. The specified method has, however, some drawbacks:

the method does not give a solution to the problem, which arises when every part in the used communication route in the bearer services do not support the chosen transmission mode, the specified method is limited to use within a single cell, leaving unanswered among others the problems associated with choosing which transmission mode and cell to use, when the current and some neighbouring cells support different transmission mode selections, the method does not give a solution to the problem, which arises when the transmission mode is changed in the middle of transmission according to the RLP protocol, namely, how to ensure that all RLP frames reach their destination, and the method does not give a solution to the problems associated with changing data transmission modes in a system, where the use of a more than one channel (timeslot) is available, among others especially the problems associated with maintaining transparent connections in such a system.

SUMMARY OF THE INVENTION

An object of the invention is to provide a method which automatically optimizes the data transfer mode in use. Another object of the invention is to realize a method which enables optimization of the data transfer mode with the least possible additions to the existing cellular telecommunication systems. Yet another object of the invention is to realize a method whereby the data transfer mode can be optimized regardless of the transmission mode (transparent/non-transparent) used. A further object of the invention is to realize a method whereby the optimization of the data transfer mode is quick.

These objects are achieved by making the data transfer mode such that it is automatically adjusted according to the quality of the connection and by using as an adjustment criterion a measure of the connection quality which is already in use in existing systems.

The invention is directed to a method wherein the data transfer mode is chosen on the basis of a characteristic representing the quality of the connection between the mobile station and the base station, and that after the choosing the interworking function (IWF) is informed of the change of data transfer mode, after which the interworking function (IWF) adapts to the new data transfer mode.

The invention is further directed to a system for optimizing transmission, which system is arranged to choose the data transfer mode used on the basis of a characteristic representing the quality of the connection between the mobile station and base station, and which system is arranged to inform the interworking function (IWF) about the change of data transfer mode after the choosing, and in which system the interworking function (IWF) is arranged to change the data transfer mode of the bearer service as a response to receiving the information about the choosing.

In the method according to the invention the data transfer mode is controlled using the downlink quality measured by the mobile station MS and the uplink quality measured by the base station subsystem BSS. In existing systems, the base station subsystem BSS uses the RXQUAL value based on those measurement results and the RXLEV value representing the strength of the received signal to control the power level of the transmission of the mobile station MS and an intra-cell or inter-cell handover. In the method according to the invention the data transfer mode can be controlled using the RXQUAL parameter, the RXLEV parameter or some other parameter representing the connection quality or a combination of these.

For transparent connections it is possible to determine a desired maximum threshold for the RXQUAL value. When the up- or downlink RXQUAL exceeds the maximum value (ie. the bit error rate BER exceeds the chosen maximum value), a more error-tolerant channel coding of lower speed is taken into use and the amount of channel resources available is increased e.g. by growing the number of time slots in order to keep the transmission rate for user data constant.

When the RXQUAL value goes below a second predetermined threshold value, channel coding of higher transmission speed is taken into use and the amount of channel resources available is decreased e.g. by decreasing the number of time slots in use. Advantageously the second and the first threshold values are different so that a suitable amount of hysteresis is achieved. In addition, it is advantageous to choose the threshold values such that the desired BER limit for user data is not exceeded.

Data transfer mode control for non-transparent connections can to a large extent be arranged in the same way as for transparent connections but advantageously said threshold values are differently set. For non-transparent connections the bit error rate BER of channel-encoded data is not important because the RLP protocol guarantees very low and constant error rate for user data. In the case of a non-transparent connection, the threshold values are advantageously chosen such that the transmission rate is maximized within the limits allowed by the channel resources available. Furthermore, in the case of a non-transparent connection, simultaneous changing of channel coding and channel resources is not necessary as the transmission rate for user data may vary.

Since the mobile station MS and the base station system BSS measure the connection quality frequently, optimization of the data transfer mode is quick. Fast adaptation to the interference level always yields the best possible performance (transmission rate for NT connections, and channel resource minimization for T connections), and automatic control requires no user intervention or knowledge of the system's operating principles.

The element controlling the data transfer mode can be either a mobile station MS, a base station subsystem BSS or a mobile services switching centre MSC/IWF.

BRIEF DESCRIPTION OF THE DRAWING

The invention is described in more detail referring to the preferred embodiments, presented for the sake of illustration, and to the accompanying drawings, wherein.

Like elements in the drawings are denoted by like reference designators.

DETAILED DESCRIPTION OF THE INVENTION

The GSM messages and abbreviations as well as protocols and procedures used in this document and applied in the current GSM system are described in greater detail in the aforementioned book "The GSM System for Mobile Communications".

In a first preferred embodiment of the invention the data transfer mode is controlled by a base station controller BSC. If the interworking function IWF is located in the base station controller BSC, the base station can simply change the data transfer mode and inform the mobile station MS about the change using the Assignment, Channel Mode Modify or Handover command or a corresponding message.

Figure 1:
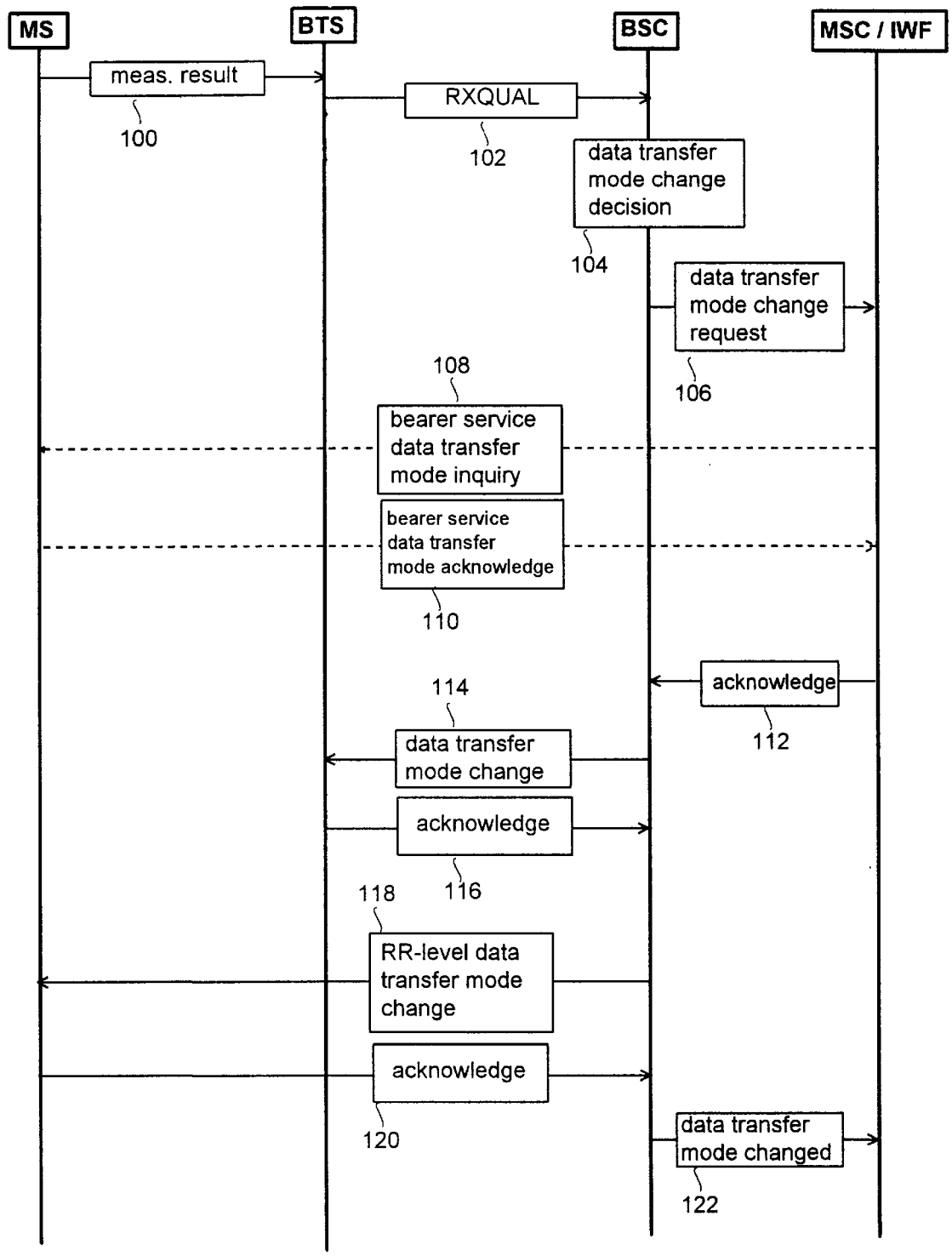
FIG. 1 illustrates signalling in the method according to the invention in an embodiment wherein a base station controller BSC controls the data transfer mode.

The situation is more complex if the interworking function IWF is not located in the base station controller BSC, in which case more signalling is needed. In the GSM system, the interworking function IWF is typically located in a mobile services switching centre MSC. FIG. 1 shows the signalling diagram for the method according to the invention applied to such an arrangement.

According to normal practice, a mobile station MS sends a report 100 of the connection quality measurement result to a base station BTS and the base station sends a corresponding RXQUAL value 102 to a base station controller BSC. When the base station controller BSC decides that the data transfer mode has to be changed 104, it notifies 106 the interworking function IWF. This is needed in case the interworking function IWF cannot notice the data transfer mode change by monitoring the incoming data flow. The base station controller BSC can use e.g. a suitable extension of the Handover Required message or other corresponding message to notify 106 the interworking function IWF.

If necessary, the interworking function IWF finds out 108, 110 the data transfer modes available in the bearer service between the mobile station MS and the interworking function IWF. The interworking function IWF can use e.g. the CC Modify command 108 or some new message 108 dedicated for this purpose to notify the mobile station MS about the data transfer mode change in order to inquire and change the data transfer mode used by the bearer service between the mobile station and the interworking function. Then the interworking function IWF acknowledges 112 to the BSC the data transfer mode used.

If the new data transfer mode decided 104 by the base station controller BSC is available in the bearer service between the mobile station and the interworking function IWF, this signalling 108, 110 between the mobile station and the interworking function is not necessarily needed. The base station controller BSC, for example, may have knowledge of the data transfer modes used by the bearer service, in which case it suffices that the BSC informs the interworking function IWF about the data transfer mode change using e.g. an in-band message 106. The BSC can have such knowledge, since the bearer service to be used is negotiated during the call setup phase. During the call, BSC may choose one of the negotiated services according to the measurement results. The bearer services can be negotiated between the mobile station MS and the mobile switching centre MSC/IWF on the CC level. After the negotiation the base station controller BSC is informed of the various data transfer modes and other parameters belonging to the negotiated service. After receiving the information, the base station controller BSC may, when necessary, choose the desired service.

After receiving an acknowledgement 112 the base station controller BSC changes the data transfer mode 114, 116 used by the base station BTS and the data transfer mode 118, 120 used by the mobile station MS. Finally, the base station controller BSC informs the interworking function IWF of the data transfer mode change 122.

Figure 2:
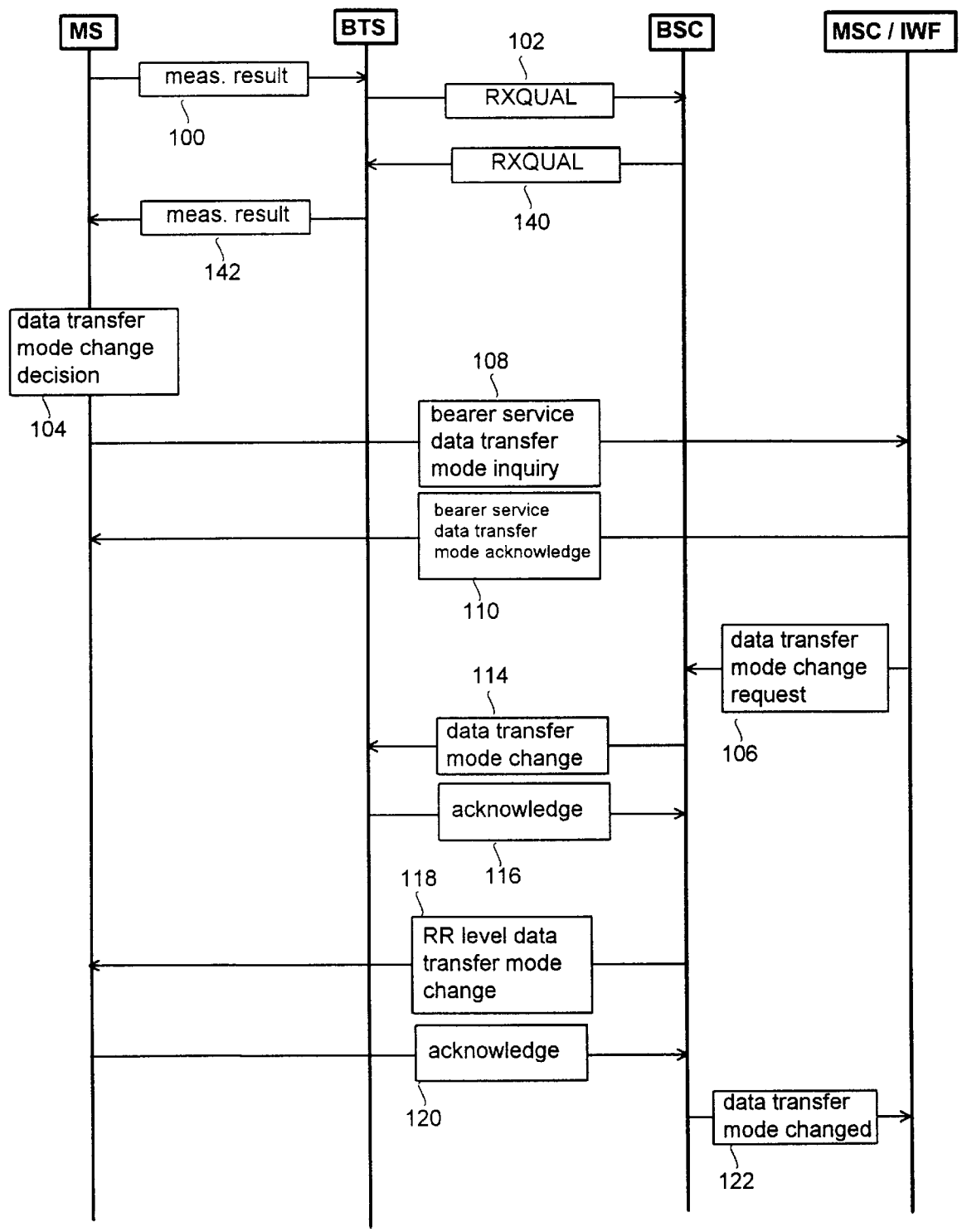
FIG. 2 illustrates signalling in the method according to the invention in an embodiment wherein a mobile station MS controls the data transfer mode.

In another embodiment of the invention the mobile station MS controls the data transfer mode used. FIG. 2 illustrates the signalling according to such an embodiment. In this case the base station controller BSC sends the upling RXQUAL measurement results to the mobile station 140, 142. In the GSM system this can be done easily as the downlink SACCH channel is normally fairly unoccupied and the base station controller BSC can add this information to existing SACCH channel messages. It is also possible to define a new SACCH message for this purpose.

Having received the uplink measurement results the mobile station MS makes a decision on the data transfer mode change 104 possibly needed. The mobile station MS can use the Modify command or another CC-level command dedicated for this purpose to inform 108 the interworking function IWF about the data transfer mode change required. The interworking function IWF acknowledges 110 the data transfer mode change to the mobile station MS and instructs 106 the base station controller to change the data transfer mode for network services. The base station controller BSC changes the data transfer mode used by the base station BTS 114, 116 and the data transfer mode used by the mobile station MS 118, 120. Finally, the base station controller BSC informs the interworking function IWF of the data transfer mode change 122.

The GSM system can use discontinuous transmission (DTX) in which the mobile station (or base station) disconnects the transmission if there is no user data to transmit: e.g. when the speaker is silent. Therefore, the GSM recommendations specify a so-called RXQUAL_SUB measurement which measures the connection quality only for those time slots that are actually used for transmission by the counter-station. A normal RXQUAL measurement measures the connection quality for all time slots that belong to the counter-station's transmission turn. Therefore, when using discontinuous transmission, a normal RXQUAL measurement gives too poor a picture of the connection quality. In the method according to the invention, the problems caused by the DTX mode can be avoided by always using only the RXQUAL_SUB measurement results for the data transfer mode control, whereby complexity of the method is also avoided. Otherwise, the base station controller BSC has to inform the mobile station about the downlink DTX status for each measurement period.

Figure 3:
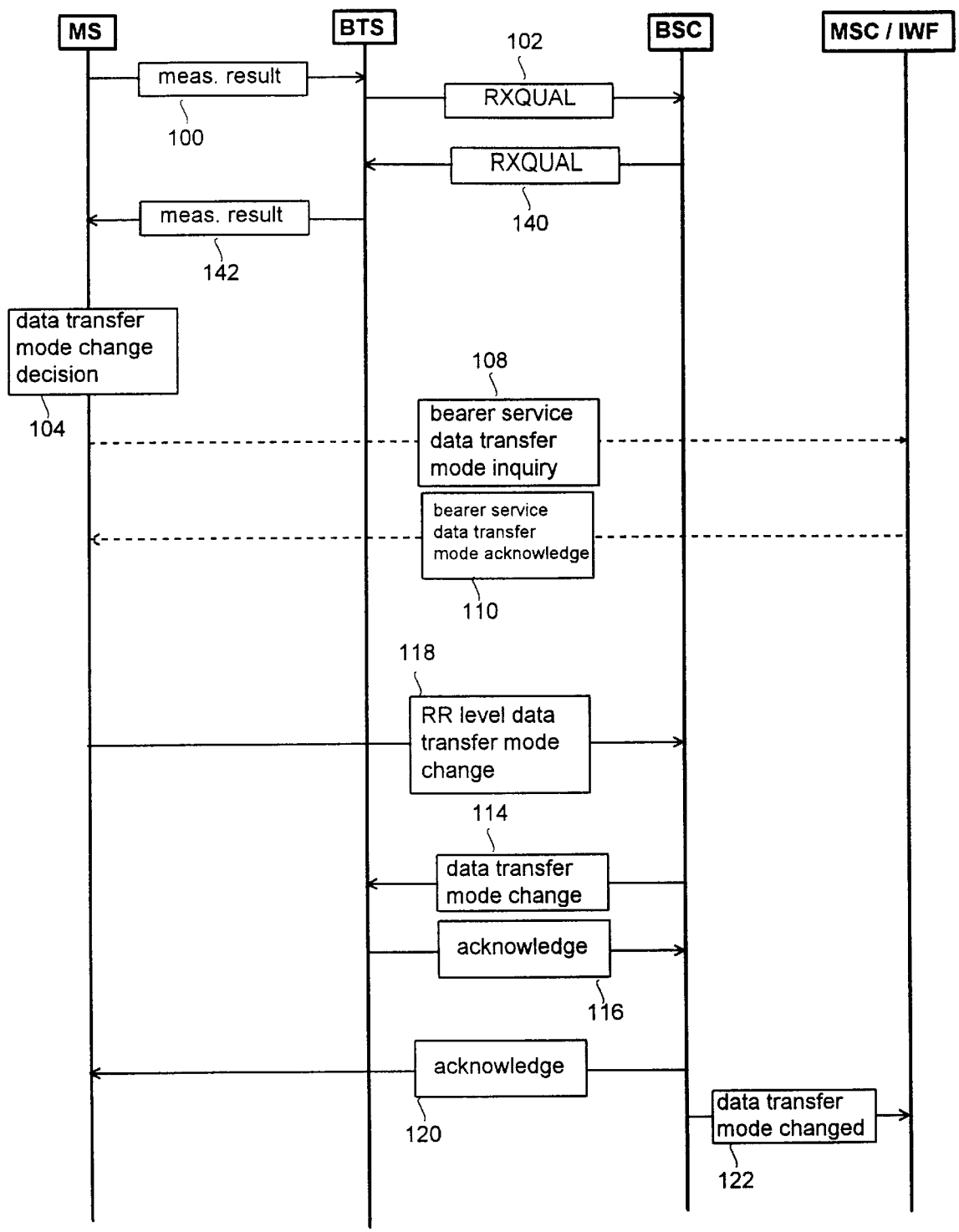
FIG. 3 illustrates signalling in the method according to the invention in a second embodiment wherein a mobile station MS controls the data transfer mode.

FIG. 3 illustrates signalling in the method according to the invention in a situation where the bearer service in use supports the new data transfer mode selected by the mobile station. Then the notice 108 from the mobile station to the interworking function IWF and the bearer service data transfer mode control by the interworking function are not necessarily needed. The mobile station MS can send 118 the data transfer mode change notice to the base station controller BSC using the RR Channel Mode Modify command or another command dedicated for this purpose. The base station controller BSC changes 114, 116 the data transfer mode used by the base station and informs 120 the mobile station MS about the change. If necessary, the base station controller BSC can inform 122 the interworking function IWF about the change.

As cellular telecommunication systems keep developing, there may arise a situation wherein not all cells of a system support new channel coding and data transfer modes. In such a case there occur handovers in the system between cells and base station controllers BSC where the participating cells and base station controllers BSC use different selections of data transfer modes. During a handover a mobile station does not know what data transfer modes are available in the new cell. When performing a handover between cells of different base station controllers BSC, the mobile services switching centre MSC uses the handover signalling to change the data transfer mode to one that is included in the selection of data transfer modes in the new base station controller BSC. If the target-BSC supporting new data transfer modes also includes cells (target-BTS) that only support old transfer modes, the target-BSC makes the decision on the data transfer mode change if the handover involves such a cell. In a handover within a base station controller BSC, the BSC makes the decision on the change to the old data transfer mode if the target cell does not support the transfer mode in use. The Handover command, for example, can be used to inform the mobile station of the new data transfer mode.

If the mobile station returns to a cell that supports said newer data transfer mode, the data transfer mode control based on the RXQUAL value, described above, can be used for selecting the optimum data transfer mode. In this case it is advantageous if the network has knowledge of the properties of the mobile station e.g. on the basis of the mobile station class definition used in the HSCSD system. In this situation, the information that is primarily needed is a list of data transfer modes supported by the mobile station.

For example, in the old cell the mobile station may be using the new 14.4-kbit/s transparent data transmission with a single time slot. As the mobile station moves into a cell that only supports 9.6-kbit/s transparent transmission the network can instruct the mobile station according to the HSCSD system to use two 9.6-kbit/s time slots. If the mobile station later moves into a cell that supports the newer 14.4-kbit/s transmission with a single time slot the network can instruct the mobile station to use this newer data transfer mode to release one time slot.

Figure 4:
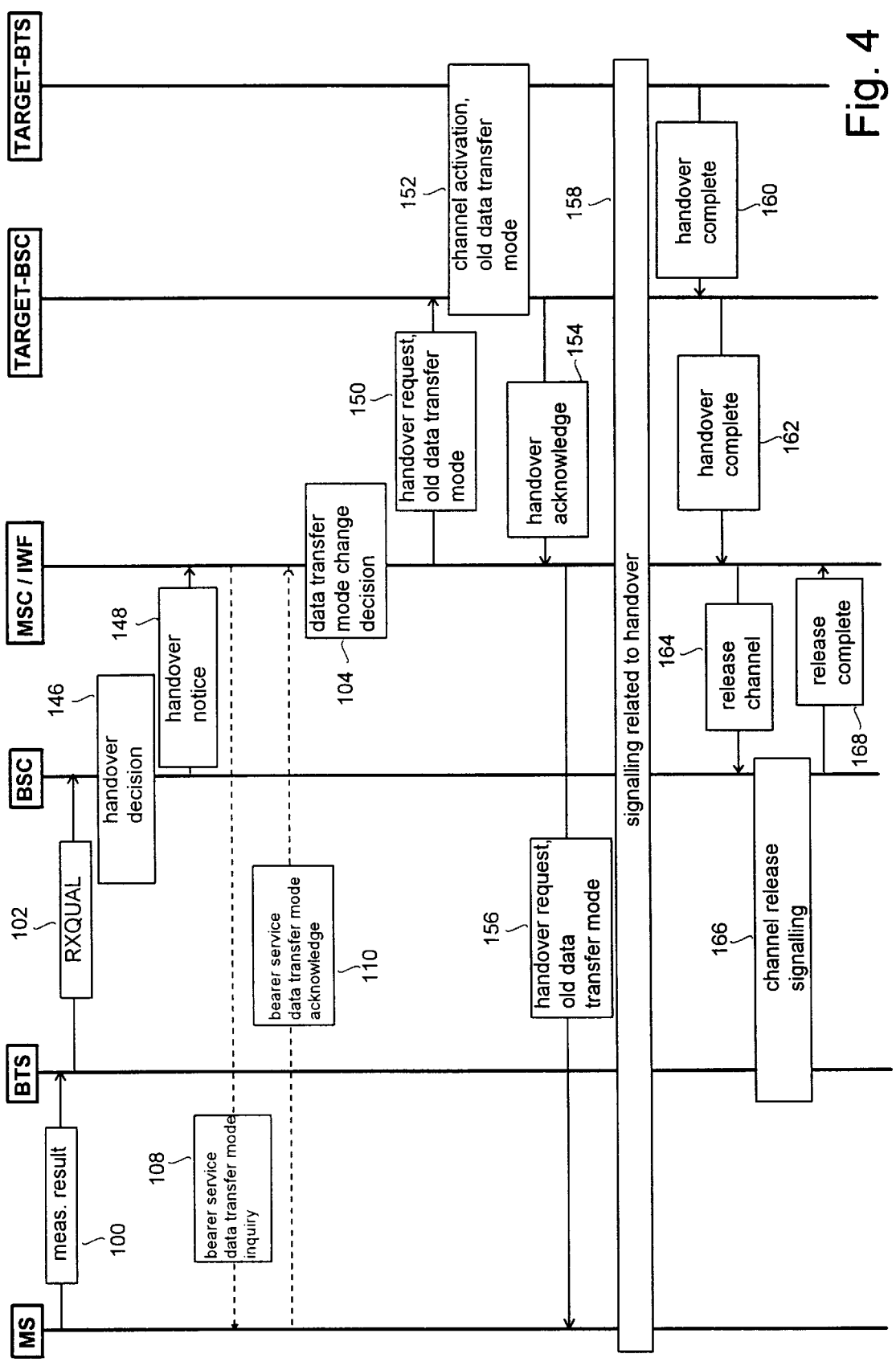
FIG. 4 illustrates signalling in the method according to the invention in conjunction with a handover where the base station controller in the target cell, TARGET-BSC, does not support the data transfer mode used in the previous cell.

FIG. 4 depicts signalling in an inter-cell handover wherein the target-BSC does not support the new data transfer mode in use. The base station controller BSC makes a decision on a handover 146 after receiving from the mobile station a connection quality measurement report 100, 102. The base station controller BSC informs 148 the mobile switching centre MSC about the handover required. The mobile switching centre MSC has the knowledge on the data transfer modes supported by the target-BSC. If necessary, the mobile switching centre MSC finds out 108, 110 the data transfer modes of the bearer service in use and makes a decision 104 on the data transfer mode change. The mobile switching centre sends a handover command 150 to the target cell and changes to one of the older data transfer modes supported by the target-BSC. The base station controller and base station in the target cell carry out handover initialization procedures 152 whereafter the base station controller TARGET-BSC in the target cell indicates 154 to the mobile switching centre that it is ready for handover. At the same time a handover command 156 is sent to the mobile station MS defining an older data transfer mode supported by the target cell as the data transfer mode used. This handover command is conveyed as such via the base station controller BSC of the source cell to the mobile station. Thereafter, the system performs the normal procedures 158 related to an inter-cell handover. When these are done, the target cell base station and base station controller indicate 160, 162 that the handover is complete whereafter the mobile switching centre instructs 164 the previous cell to release the channels used. Finally, the previous cell performs 166, 168 the channel release.

If the RLP protocol of the new data transfer mode used in the previous cell is different from the RLP protocol of the older data transfer mode used in the target cell, the RLP protocol of the previous cell has to be reset and the RLP protocol of the target cell has to be initialized. Frames sent but not yet acknowledged have to be re-sent according to the RLP protocol of the target cell. If the RLP protocols of said new and older data transfer modes are the same, link reset or link initialization are not needed.

In some cases it might be necessary to use a service-specific selective handover. If the connection can be handed over to more than one target cell, the target cell can be selected according to the data transfer modes supported by these cells. This kind of selection may differ from a target cell selection made with the normal criteria. For example, if the previous cell was using a 14.4-kbit/s transmission rate, the connection could be handed over to another cell supporting 14.4 kbit/s even though there were in the proximity a cell with a better measured connection level RXLEV value but supporting only the older 9.6-kbit/s transmission rate. This kind of service-specific inter-cell handover requires that a new handover algorithm be added to the base station systems BSS complying with the current recommendations.

In the above description the invention was applied in the GSM system, but the invention is not, however, restricted to be applied solely in the GSM system. The abbreviations, messages and terms used above are examples according to the GSM system and corresponding concepts and elements are to be found in many other cellular telecommunication systems in which this invention can be applied, such as GSM-HSCSD, CDMA (IS-95), US-TDMA, PDC and UMTS systems.

Above it was described in an exemplary manner how the data transfer mode can be controlled using the RXQUAL value. In addition to the RXQUAL value, the method according to the invention can control the data transfer mode using the RXLEV value representing the strength of the received signal, or another characteristic of a cellular telecommunication system representing the connection quality, or a combination of these.

The method according to the invention provides fast data transfer mode optimization as the optimization is based on connection quality measurements performed frequently by the mobile station and the base station system. The method is also simple to implement as it uses already existing measurement procedures and results. Automatic data transfer mode control is also easy to the user because he need not know the structure of the gsm system nor the momentary connection quality required for transmission optimization.

What is claimed is:

1. A method for optimizing transmission in a cellular mobile telecommunication system wherein it is possible to use more than one data transfer mode between a mobile station and a base station, and the transmission rate for user data enabled by the data transfer mode depends at least on the channel resources available and on the redundancy of the channel coding used, and the channel resources available to the mobile station (MS) are limited, and the mobile station (MS) has access to a limited selection of various channel coding methods, wherein the data transfer mode used is chosen on the basis of a characteristic representing the quality of the connection between the mobile station (MS) and base station (BTS), and that after the choosing the interworking finction (IWF) is informed of the change of data transfer mode, after which the interworking function (IWF) adapts to the new data transfer mode; and wherein, upon a change in the data transfer mode which provides a reduction of the data transfer rate, there is a step of increasing the number of time slots available for use in transmission of data between the mobile station and the base station to maintain an essentially constant data transfer rate.

2. The method of claim 1, wherein said characteristic is based at least partly on the result of a RXQUAL measurement.

3. The method of claim 1, wherein said characteristic is based at least partly on the result of a RXLEV measurement.

4. The method of claim 1, wherein when the connection quality drops below a first predetermined threshold, a request is made for more channel resources.

5. The method of claim 4, wherein when the connection quality improves such that it exceeds a second predetermined threshold, channel resources are freed if more than the minimum amount of channel resources are in use.

6. The method of claim 1, wherein when the connection quality drops below a first predetermined threshold, a more redundant channel coding is taken into use if the channel coding in use is not the most redundant channel coding in said selection used.

7. The method of claim 6, wherein when the connection quality improves such that it exceeds a second predetermined threshold, a less redundant channel coding is taken into use if the channel coding in use is not the least redundant channel coding in said selection used.

8. The method of claim 1, wherein the data transfer mode used is controlled by the mobile station (MS).

9. The method of claim 1, wherein the data transfer mode used is controlled by the base station controller (BSC).

10. The method of claim 1, wherein the data transfer mode used is controlled by a mobile services switching center (MSC/IWF).

11. The method of claim 1, wherein, during a handover procedure, when changing data transfer modes in a case where the RLP protocol of the new data transfer mode for a new cell differs from that of the old data transfer mode of the previous cell, the RLP protocol of the new data transfer mode is reset or initialized, if necessary, and the frames transmitted but not yet acknowledged according to the old RLP protocol are retransmitted according to the RLP protocol of the new data transfer mode.

12. The method of claim 1, wherein it comprises stages in which the base station controller (BSC) decides on a data transfer mode change, the base station controller (BSC) changes the data transfer mode used by the base station (BTS), the base station controller (BSC) changes the data transfer mode used by the mobile station (MS), and the base station controller (BSC) informs the interworking finction (IWF) that the data transfer mode has been changed.

13. A system for optimizing transmission in a cellular telecommunication system, wherein it is possible to use more than one data transfer mode between a mobile station and a base station, and the transmission rate for user data enabled by the data transfer mode depends at least on the channel resources available and on the redundancy of the channel coding used, and the channel resources available to the mobile station (MS) are limited, and the mobile station (MS) has access to a limited selection of various channel coding methods;

the system is arranged to choose the data transfer mode used on the basis of a characteristic representing the quality of the connection between the mobile station (MS) and base station (BTS), and furthermore the system is arranged to inform the interworking function (IWF) about the change of data transfer mode after the choosing, and the interworking function (IWF) is arranged to change the data transfer mode of the bearer service as a response to receiving the information about the choosing; and wherein, upon a change in the data transfer mode which provides a reduction of the data transfer rate, the system is operative to increase the number of time slots available for use in transmission of data between the mobile station and the base station to maintain an essentially constant data transfer rate.

14. The system of claim 13, wherein said characteristic is based at least partly on the result of a RXQUAL measurement.

15. The system of claim 13, wherein said characteristic is based at least partly on the result of a RXLEV measurement.

16. The system of claim 13, wherein the data transfer mode used is controlled by the mobile station (MS).

17. The system of claim 13, wherein the data transfer mode used is controlled by the base station controller (BSC).

18. The system of claim 13, wherein the data transfer mode used is controlled by a mobile services switching center (MSC/IWF).

* * * * *